United States Patent [19]
Laass

[11] 3,872,384
[45] Mar. 18, 1975

[54] ELECTRICAL WIRING, CIRCUIT, ENERGIZATION, AND RESISTANCE TEST APPARATUS

[75] Inventor: Heinz Laass, Hahn, Germany

[73] Assignee: Taco-Tafel GmbH & Co. KG, Esslingen(Neckar), Germany

[22] Filed: Feb. 6, 1974

[21] Appl. No.: 439,914

[30] Foreign Application Priority Data
Mar. 6, 1973 Germany............................ 2311012

[52] U.S. Cl....................... 324/51, 324/62, 324/133
[51] Int. Cl........................................... G01r 31/02
[58] Field of Search ................. 324/51, 52, 54, 133

[56] References Cited
UNITED STATES PATENTS

| | | | |
|---|---|---|---|
| 3,284,707 | 11/1966 | Clinton............................ | 324/51 X |
| 3,289,074 | 11/1966 | Jones................................... | 324/54 |
| 3,529,237 | 9/1970 | Kilchhofer............................ | 324/51 |

OTHER PUBLICATIONS
Loiselle, J. T., Low–Voltage and Current Continuity Tester, IBM Tech. Disc. Bulletin, Vol. 12, No. 7, Dec. 1969, p. 926.

*Primary Examiner*—Gerard R. Strecker
*Attorney, Agent, or Firm*—Flynn & Frishauf

[57] ABSTRACT

To test continuity of circuits, as well as insulation between conductors of electrical wiring, and to determine voltage levels of energization in the circuit, within threshold limits, an electrical oscillator is connected in the circuit which includes a d-c voltage injection source, such as a battery in circuit with a resistor, connected to the oscillator, the resistance, when in circuit, providing an oscillation frequency in the audio range resulting in a predetermined tone which, when the resistance is modified by defective insulation resistance of a line, changes; to test for circuit continuity, a switch interrupts connection of the power supply to the oscillator which, if there is a high resistance in the circuit, will not oscillate, or at a different frequency; or, if a voltage level exists in the test circuit, the frequency will again change.

11 Claims, 1 Drawing Figure

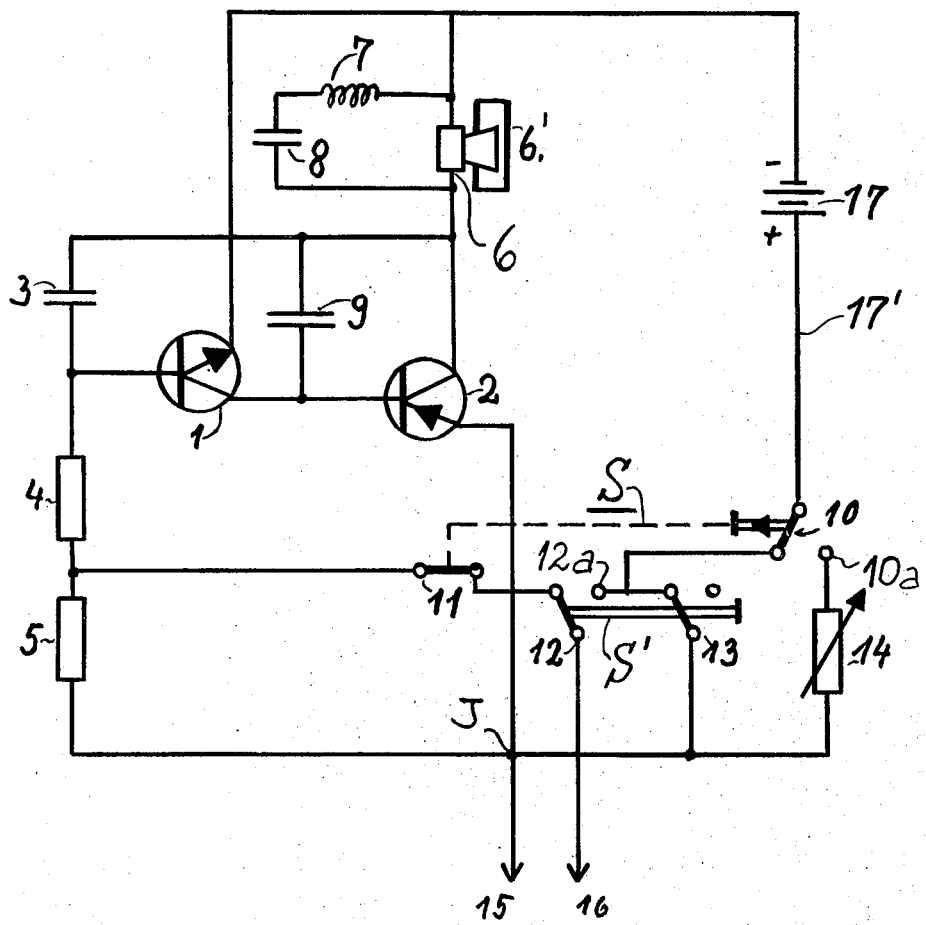

ELECTRICAL WIRING, CIRCUIT, ENERGIZATION, AND RESISTANCE TEST APPARATUS

The present invention relates to an electrical test apparatus, particularly for electrical wiring, to check for continuity of the wiring, insulation between the wiring and adjacent wiring, or carrying elements such as substrates, and voltage levels in the wiring, for example logic levels if the wiring is part of a logic network.

Various types of electrical test apparatus have been proposed; wiring testers usually can distinguish only clearly between a continuous wiring circuit, and an open circuit; the open circuit may, however, still be a closed circuit which, however, includes somewhere in the network a high resistance, so that under "open circuit" the customary electrician's denotation is to be understood, that is, a circuit which does not permit the passage of substantial power flowing therethrough. Such apparatus, as customarily used, will respond to a poor connection closed circuit (which should, however, indicate an open circuit) but may indicate, by decreasing amplitude of indication, that the circuit is not of a desired low resistance value. Various types of acoustically responding, or visually responding apparatus have been proposed; acoustic apparatus usually include an oscillator. In the customary apparatus, the loudness of the tone generated by the oscillator has a direct proportion to the resistance in the circuit. There is little change in frequency of oscillation.

The human ear is very sensitive to pitch of frequencies, that is, can readily differentiate between already small changes in frequency; it is not, however, equally sensitive to different intensities of tone, particularly when there is no ready reference, or the general surrounding noise level is high. Testing circuits by distinguishing between intensity, or amplitude of a tone being generated by a test instrument, thus is rather inexact, and highly dependent on extraneous noise levels, and also highly different from individual to individual. Testing, however, by change of frequency permits use by the apparatus of different individuals, with different responses to sound, and essentially independent of general ambient noise level.

It is an object of the present invention to provide an apparatus in which the quality and, possibly, voltage levels within a sampling circuit can be tested, the output being an acoustical signal of varying pitch, in which the pitch variation is an indication of characteristics of the circuit, or the wiring or network, or of selected energization thereof.

SUBJECT MATTER OF THE PRESENT INVENTION

Briefly, an electrical oscillator circuit, including a feedback circuit, is so connected to an audio transducer that the oscillator will oscillate at frequencies which permit the audio transducer to emit an audible tone; the transducer may, for example, be a small loudspeaker, earphones, or the like. The frequency of oscillation of the transducer is controlled by a circuit which has a certain voltage appear thereacross, for example by having a resistance arranged in the circuit connected to a voltage source. The test circuit is then connected to the resistance, for example in parallel therewith, so that the resistance which is introduced into the circuit, and hence the voltage drop thereacross is determined by the overall resistance of the resistor in the test unit and the resistance of the tested or sampled circuit. The frequency of oscillation of the oscillator will then change, in accordance with this change in overall resistance; this type of test may be used, for example, to test for insulation resistance between two unconnected lines. Upon connection of these lines to the test unit, the frequency of oscillation of the oscillator, and hence the pitch of the tone should not change.

In accordance with a feature of the invention, the circuit is so arranged that, for example upon operation of a switch, the test terminals are then connected into the oscillating circuit in such a manner that continuity tests can be carried out on lines which should be closed, that is, present no appreciable or only a very low resistance (for example in the order of a fraction of an ohm to a few ohms or, about 50 ohms or 100 $\Omega$ at the most). If the lines to be tested for continuity are discontinuous, or have a very high resistance, oscillation of the oscillator will be inhibited. The test connection may be so arranged in the circuit that, for example, supply voltage is removed from the oscillator.

In accordance with another feature of the invention, a variable resistor is included in the circuit which can be connected, selectively, instead of the test leads. By matching the pitch of the tone at which the oscillator oscillates when the resistance is connected, with the tone when the test circuit is connected, and by calibrating the variable resistance, a determination of the resistance of the test circuit can then be made by determining a match in reading off the calibration.

In accordance with yet another feature of the invention, voltage levels in the circuit to be tested can also be checked by connecting the test leads and determining if pitch of oscillation changes, for example, by again matching the change in pitch with a similar change, upon introducing of known voltage levels into the oscillating circuit and observing the pitch of the tone being generated thereby. Relative voltage levels arising in logic circuits can thereby be checked, that is, the difference in voltage level at test points, for example, in a circuit can be determined, if the test point is energized to represent either a ZERO or a ONE, in binary notation.

Specific frequencies of the tone being generated by the transducers can be pre-emphasized by connecting the transducer to a resonating network, which may be either an electrical tank circuit, or a Helmholtz resonator.

The invention will be described by way of example with reference to the accompanying drawing, wherein the single FIGURE illustrates a circuit diagram of the test apparatus in accordance with the present invention.

An oscillatory circuit, including transistors 1, 2, and a capacitor 3 is connected in a feedback circuit, which further includes a resistor 4, limiting the base current of transistor 1, and a resistor 5, which is of high value. The frequency of oscillation is, essentially, determined by the capacitance of capacitor 3 and the resistance of resistor 5. The emitter of transistor 1 is connected to one terminal of a battery 17; the collector of transistor 1 is connected to the base of the transistor 2, the emitter of which is connected to a common junction J. The collector of transistor 2 is connected to an audio transducer 6, such as a loudspeaker, which operates within an enclosure 6', forming a Helmholtz resonator. A resonance circuit formed of a coil 7 and capacitor 8 is connected across the transducer 6. The other terminal of the transducer 6 is connected to the negative terminal of battery 17. The collector of transistor 2 is connected back by means of capacitor 9 to the base thereof, and additionally over capacitor 3 to the base of transistor 1. The base of transistor 1 is further connected over resistor 4 and resistor 5 to junction J. The junction J is connected, further, to one test terminal 15, to which one wiring line is to be connected. Junction J is further connected to a switch terminal 13, and to a resistor 14, which is variable, and the resistance value of which can be calibrated. The other terminal of resistor 14 is connected to the free terminal of a changeover switch 10, the common terminal of which connects over a wire connection 17' to the positive terminal of battery 17. The junction between resistors 4 and 5 is connected to a switch 11 which further connects to a switch 12 which, in turn, is connected to the second test terminal 16.

The inductance of coil 7 and the capacitance of capacitor 8 are so adjusted, with respect to the self-inductance and resistance of transducer 6, that a certain tone, that is, the output from transducer 6 at a certain pitch, is emphasized. Thus, the pitch of certain tones which would be indicative of proper operation, or characteristics of a circuit to be tested, can be emphasized, that is, proper operation will be indicated by a higher level of output. Comparison is, however, made by comparing pitch; the higher level, at proper operation, is provided to call attention to proper operation, rather than to function as a comparative output indication.

First Mode of Operation: test mode to test for insulation resistance between connections made to test terminals 15, 16: Insulation resistance, for example between a pair of separate, insulated conductors, or between a conductor and a substrate connected, respectively, to terminals 15, 16, is treated by connecting the circuit with the switches as shown in the full-line position in the FIGURE. Upon connection of the battery 17, the oscillator will oscillate at a frequency determined by the relative values of capacitor 3, resistance 5 (principally) and resistance 4. Capacitor 9 effects reliable starting of oscillation of the oscillator. Upon connection of a finite resistance between terminals 15, 16, the frequency of the oscillator will increase. This resistance, in effect, is connected in parallel to resistor 5. The resistance of resistor 5 can be very high, and the test set, switched, as shown, is particularly suitable to test for insulation resistance.

Second mode of Operation: to test for voltage levels, such as logic voltage levels: Foreign voltages, for example representative of voltage levels in logic circuits, can be determined by using the circuit, as shown in the FIGURE, with the switch S connected as shown in the solid lines.

Upon connection of a circuit in which a foreign voltage arises in such a manner that the positive terminal thereof is connected to test terminal 16, the frequency of oscillation of the oscillator will increase. If the positive terminal is, however, connected to the test terminal 15, the frequency will drop. The decrease in pitch of the tone from transducer 6 is an indication of the voltage level; if the voltage level is sufficiently high, the frequency of oscillation of the oscillatory circuit will drop to such an extent that the oscillator will completely cease oscillation.

Mode of operation for comparative testing: The switch S is changed in such a manner that the switch contact 10 is connected over to connect with terminal 10a, connected to the resistor 14, and switch connection 11 is opened. Connection from switch 11 to test terminal 16 is thus interrupted. Resistor 14 is, preferably, a calibrated resistor. The oscillator will oscillate with a frequency determined by capacitor 3, and the resistance of resistors 4, 5 and the set or adjusted resistance of resistor 14. The pitch of the tone of oscillation can be changed by changing the setting of resistor 14. This tone is so adjusted, by adjustment of resistor 14, until it matches the tone which is obtained when the switch is in the position shown in full lines in the FIGURE, that is, before changing switch connections 10 and 11. By repeated switching back and forth, the pitch can be readily matched to be equal, regardless of switch position, and a scale connected to the calibrated resistor 14, on which the respective parameters, or characteristics of the test lines or network connected to terminals 15 and 16 are indicated, will then indicate the actual value of voltage level connected to terminals 15, 16 (mode 2) or insulation resistance between connections made to terminals 15, 16 (mode 1).

Third mode of operation: to test for continuity, or line resistance: The switch S', and having connection elements 12, 13, is changed to the opposite position from that shown in the drawing, that is, the switch terminal 12 is changed over to engage terminal 12a. This interrupts continuity of connection by the wide line 17' between battery 17 and junction J, since switch terminal 13 will be open. Oscillations can occur only if an extraneous circuit is connected between terminals 15, 16 to close the circuit between the battery 17 and junction J over the switched-over switch connection 12. This resistance should be low. If the resistance inserted in series with the battery 17 is increasing, the frequency of oscillation of the oscillator will increase. The circuit is very sensitive to introduction of any resistance in series with the battery 17 and, therefore, is sensitive also to small changes in resistance values. It is, therefore, highly suitable to test continuity of electrical circuits. An open circuit is indicated by failure of the oscillator to oscillate.

Mode of operation for comparative testing of line resistance: Switch S' is changed over, as in the mode to test for open and closed lines; additionally, switch S is changed back and forth in order to match the pitch of oscillation when the switch connection 10 engages contact 10a with the pitch of oscillation when the switch connection 10 is in the full-line position shown in the drawing. The opening and closing of switch 11, in this case, is without effect since switch connections 12 is changed over to terminal 12a, by operation of the switch S', so that the other terminal of switch connection 12 is open anyway. Current to operate the oscillator will, therefore, flow either over the calibrated resistor 14, with switch S in the right-hand position (not shown) or over the test or sampling circuit connected to terminals 15, 16, when switch S is in the full-line position shown. By matching the pitch of the tone, that is, frequency of oscillation, upon adjustment of resistor 14 to that when the switch S is in the position shown in the FIGURE, the resistance introduced between terminals 15, 16 can be determined. In this mode of operation, the actual resistance of resistor 14 is equal to the resistance of the circuit connected between the terminals 15, 16. In the previously discussed comparison testing modes, the resistance of resistor 14 is merely a representative value of the actual resistance, or voltage level connected between terminals 15, 16.

The loudness, that is, the amplitude of the tone provided by transducer 6 changes only little; specific pitch levels can be amplified by suitable choice of the inductance and capacitance of the tank circuits 7, 8, and by suitable arrangement and dimensioning of a Helmholtz resonator 6', either of them, or both. Either of them, or both, may be variable, or settable for specific pitch levels, for example to emphasize tones which would be representative of predetermined voltage levels in the circuit connected to terminals 15, 16, upon testing for voltage levels therein; or frequencies which are emphasized to be representative of proper operating conditions, or characteristics of the test circuit or network or lines connected to terminals 15, 16. The emphasis arrangement, or network, may have a suitable band width so that ranges of proper operation can thereby be highlighted.

The calibration of an adjustment knob for resistor 14 preferably has three scale: insulation resistance, voltage levels, and line, or connection or continuity resistance. The insulation resistance will, of course, be in the extremely high range, the continuity test resistance in a very low range, and the voltage level may be anywhere, as selected, for example between 0 and 24 V. The battery 17, itself, may consist of one or more flashlight cells, or a storage battery of suitable voltage, for example between 6 or 24 V. The test apparatus thus can be used for universal testing, that is, by testing for resistance within a circuit by listening to the pitch, that is, the frequency of oscillation of the oscillator. Two test ranges of highly divergent values can readily be sensed by the same apparatus, namely continuity of electrical lines (ranges in the order of a fraction to several to, for example, between 50 and 100 ohms, and in the order of megohms and tens and hundreds of megohms). The low resistance range provides accurate determination of resistance values, and permits ready discrimination between extremely low resistances, such as a fraction of an ohm, or a few ohms, with respect to tens of ohms and, of course, even more so with respect to hundreds or thousands of ohms. Thus, continuity and quality of electrical lines can be checked. Logic levels can be sensed, not only by discriminating between a high level and a low level, but also to determine proper polarity of the logic levels. The acoustic indication is particularly sensitive since it is based on change in pitch, and not change in amplitude; pre-emphasis of certain amplitudes can be provided to highlight certain conditions or ranges.

Various changes and modifications may be made within the scope of the inventive concept.

What is claimed is:

1. Industrial wiring, circuit, energization, and resistance test apparatus having acoustic output to test for line resistance, insulation resistance, or voltage levels and polarities arising in an electrical sample network comprising a two-stage electrical oscillator-amplifier circuit (1, 2, 3, 4, 5) having two transistors (1, 2) connected in cascade, and an R/C circuit (3, 4, 5), the relative values of resistance and capacity of which affect the frequency of operation thereof, the capacitor (3) of said R/C circuit connecting the output of the second transistor (2) to the input of the first transistor (1) to provide for feedback of said oscillator circuit, said first transistor (1) having a bias circuit including a high value resistor (5) of said R/C circuit and forming a portion of the bias circuit;

audio transducer means coupled to said oscillator circuit for reproducing the tone thereof;

a source of d-c voltage (17) and a low resistance connection (17') from said sources to the transistors (1, 2) of the oscillator circuit;

test connection means (15, 16) to which the sample circuit is connectable;

and switch means (S') connected to said test connection means and to the oscillator circuit to selectively connect:

a. when the switch means is in one position, the test connection means (15, 16) in parallel to the resistor (5) to test the sample network for a-1. insulation resistance between test connection means to check for insulation of an open circuit between said test connection means, the value of the total resistance being introduced by the resistor (5) and the insulation resistance connected in parallel thereto determining and controlling the pitch of the tone reproduced by the transducer means as an analog of said total resistance, or a-2. voltage levels therein, in that introduction of a foreign voltage to the test connection means will affect the bias voltage across resistor (5) and disturb the balanced state of the oscillator circuit to change the frequency of oscillations to a different pitch whereby the level and/or polarity of the foreign voltage source can be determined; and b. when the switch means is in another position, the test connection means (15, 16) in series with said d-c source (17) and the low resistance connection (17') to interrupt the circuit from said source to the oscillator means unless the sample network has ZERO, or essentially ZERO or low resistance to provide an output test oscillation from the oscillator circuit, the pitch of which is indicative of the resistance of the sampling network placed in series between said source and the oscillator circuit.

2. Apparatus according to claim 1, wherein the circuit parameters of the oscillator circuit, said resistor (5) and said source of voltage (17) are relatively adjusted to increase the frequency of oscillation of the oscillator circuit, when the switch means is in said one position, upon decrease of the total resistance of the R/C circuit due to the sample circuit being connected to the test connection means (15, 16) and in parallel to said resistor (5).

3. Apparatus according to claim 1, further comprising a tank circuit (7, 8) connected to the audio transducer means (6) to emphasize a predetermined frequency, or frequencies.

4. Apparatus according to claim 1, further comprising a Helmholtz resonator (6') acoustically coupled to the audio transducer means (6) to emphasize a predetermined frequency or frequencies.

5. Apparatus according to claim 1, wherein said test connection means are polarized.

6. Apparatus according to claim 1, further comprising calibrated resistance means (14) selectively connectable to the oscillator circuit in place of the sample network to establish a pitch of oscillation for comparison with the pitch of oscillation when the sample network is connected; and rapid switch-over means (S) to connect either the test connection means (15, 16) and hence the sample network connected thereto, or said calibrated resistance means (14) to the oscillator means to permit rapid comparison of pitch of audio oscillations when the oscillator oscillates with said calibrated resistance, or said sample network, respectively, connected in circuit therewith.

7. Apparatus according to claim 6, wherein said calibrated resistor (14) is calibrated in insulation resistance values.

8. Apparatus according to claim 6, wherein the calibrated resistor (14) is calibrated in voltage levels.

9. Apparatus according to claim 6, wherein the calibrated resistor (14) is calibrated in low-resistance values.

10. Apparatus according to claim 9, wherein the low-resistance values of calibration are in the range of below 100 ohms.

11. Apparatus according to claim 6, wherein said calibrated resistor is calibrated in: insulation resistance; voltage levels; line resistance values in a range up to about 100 ohms.

* * * * *